(12) United States Patent
Soulhi et al.

(10) Patent No.: US 7,187,682 B2
(45) Date of Patent: Mar. 6, 2007

(54) PACKET DATA SERVING NODE (PDSN) LOAD OPTIMIZATION

(75) Inventors: Said Soulhi, Saint Laurent (CA); Mahmood Hossain, Pointe Claire (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1024 days.

(21) Appl. No.: 10/167,956

(22) Filed: Jun. 13, 2002

(65) Prior Publication Data

US 2003/0156537 A1 Aug. 21, 2003

Related U.S. Application Data

(60) Provisional application No. 60/357,819, filed on Feb. 21, 2002.

(51) Int. Cl.
*H04L 12/28* (2006.01)

(52) U.S. Cl. ...................... 370/401; 370/342

(58) Field of Classification Search ............ None
See application file for complete search history.

(56) References Cited

U.S. PATENT DOCUMENTS 6,370,560 B1 * 4/2002 Robertazzi et al. ......... 718/105

| | | | |
|---|---|---|---|
| 2003/0021252 A1 * | 1/2003 | Harper et al. | 370/338 |
| 2003/0053465 A1 * | 3/2003 | Sivalingham et al. | 370/401 |
| 2003/0074443 A1 * | 4/2003 | Melaku et al. | 709/224 |
| 2003/0153324 A1 * | 8/2003 | Veerepalli et al. | 455/453 |
| 2004/0098477 A1 * | 5/2004 | Kang | 709/224 |
| 2004/0248577 A1 * | 12/2004 | Sayeedi | 455/445 |

* cited by examiner

*Primary Examiner*—Duc Ho
(74) *Attorney, Agent, or Firm*—Alex Nicolaescu; Ericsson Canada, Inc.

(57) ABSTRACT

A method and node for supporting PDSN load optimization in a CDMA2000 network. The Packet Core Network Manager calculates network statistics and uses the resulting numbers to set the PPP inactivity timer depending on the load on the PDSN. In a preferred embodiment, the calculation gives the mean value of the durations of the PPP sessions (KPI1), and the corresponding standard deviation (KPI2). The PPP inactivity timer is then set to $M*(KPI1+KPI2)$ during low load, to $M*KPI1$ during normal load, and to $M*(KPI1-KPI2)$ during heavy load, where $0<M<=1$, preferably depending on the distribution of the subscriber inter-arrival time.

14 Claims, 2 Drawing Sheets

PACKET DATA SERVING NODE (PDSN) LOAD OPTIMIZATION

Priority Statement Under 35 U.S.C. S.119(e) & 37 C.F.R. S.1.78

This non-provisional patent application claims priority based upon the prior U.S. provisional patent application entitled "PACKET DATA SERVING NODE (PDSN) LOAD OPTIMIZATION", application No. 60/357,819, filed Feb. 21, 2002, in the names of Said SOULHI, and Mahmood HOSSAIN.

BACKGROUND OF THE INVENTION

1. Field of the Invention

The present invention relates generally to mobile telecommunications, and in particular to PDSN load optimization in mobile telecommunications networks.

2. Description of the Invention

CDMA2000 is a 3G mobile telecommunications standard that among other thing provides mobile Internet Protocol (IP) services to mobile nodes (MNs).

FIG. 1 illustrates a simplified CDMA2000 network 100 that comprises a Packet Data Serving Node (PDSN) 113, and a Packet Core Function (PCF) usually co-located with a Base Station Controller (BSC) 112. The PDSN 113 acts as a kind of gatekeeper, deciding what MNs are allowed to use services and access the network, and is the gateway for traffic to the interconnecting network 114, to which for instance entities such as servers and other MNs that the MN 111 desires to contact. In the BSC/PCF 112, the BSC among other things establishes the traffic channel (TCH) 121 for the MN 111 to use and the PCF decides which PDSN to send the traffic through. A Packet Core Network Manager (PNM) 115 is responsible for management of the packet core network, comprising among other things the PDSN 113, and is thus informed of for example the load of the PDSN 113. Note that the PNM 115 is not necessarily connected to the PDSN 113 the way it is shown in FIG. 1.

When an authorised mobile node (MN) 111 wants to use the network 100, in the BSC/PCF 112, the BSC sets up a traffic channel (TCH) 121 with the MN 111, and the PCF sets a R-P connection 122 with the PDSN 113. The PDSN 113 and the MN 123 establish a PPP connection 123.

The MN 111 is not obliged to transmit or receive continuously for the PPP connection 123 to remain established and the PDSN 113 is likely to have a plurality of PPP connections with various MNs. In order to get rid of PPP connections that have not been used in a relatively long while, the PDSN 113 has a PPP inactivity timer for each PPP connection. When the PPP inactivity timer expires, the PDSN 113 terminates the PPP connection 123, which means that the MN 111 has to renegotiate a new PPP connection if it desires to be in connection with the PDSN 113.

It can be appreciated that it is important to have PPP inactivity timers, as there is a limited number of PPP connections a PDSN can support. Today, the PPP inactivity timer is a fixed value set by the network administrators or by the PDSN manufacturers. It can also be appreciated that a fixed PPP inactivity timer value is not efficient, as this value for example may be unnecessarily short when there is little load, i.e. few PPP connections, on the PDSN, and unnecessarily long when there is much load on the PDSN.

For these reasons, it would be advantageous to have a more flexible way to set the PPP inactivity timer. This invention provides such a solution.

SUMMARY OF THE INVENTION

In one aspect, the present invention is a method for load optimization of a first node in a telecommunications network. The first node has a plurality of connections to a plurality second nodes and an inactivity timer is associated with each of the plurality of connections. The method comprises the steps of collecting network data, selecting the relevant collected network data for calculations, calculating at least one value using the selected data, and setting at least one inactivity timer based on the at least one value.

In another aspect, the present invention is a management node in a telecommunications network for management of a managed node. The managed node has a plurality of connections to a plurality of second nodes and an inactivity timer is associated with each of the plurality of connections. The management node comprises a memory that stores network data, and a processing unit that selects the relevant stored network data from the memory for calculations, calculates at least one value using the selected data, and sets at least one inactivity timer based on the at least one value.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
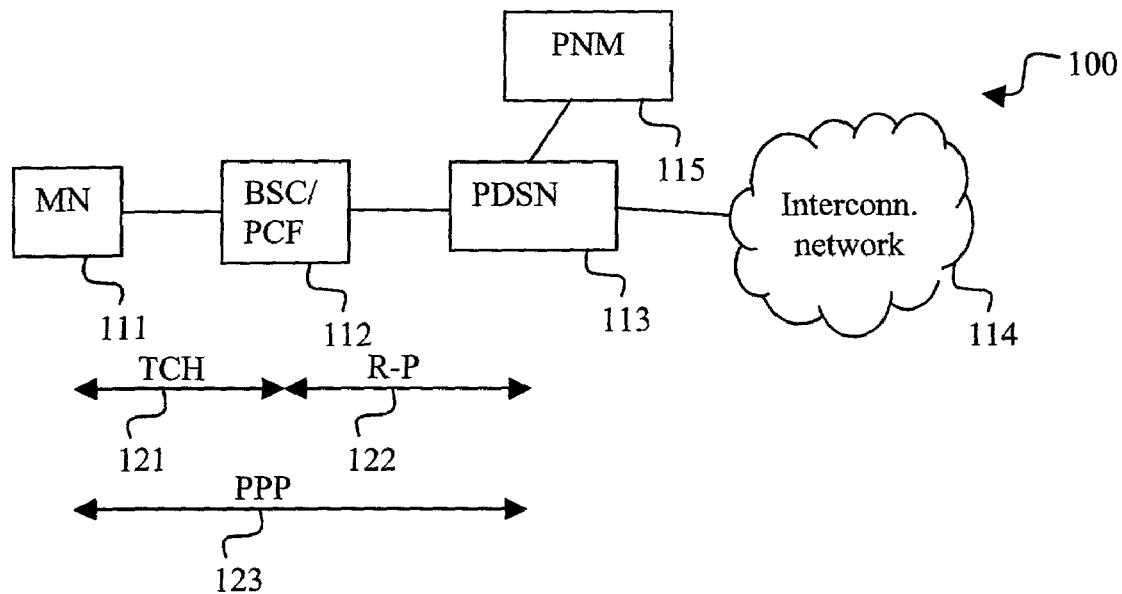
FIG. 1 is a block chart illustrating a simplified prior art CDMA2000 network.

The innovative teachings of the present invention will be described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

Figure 2:
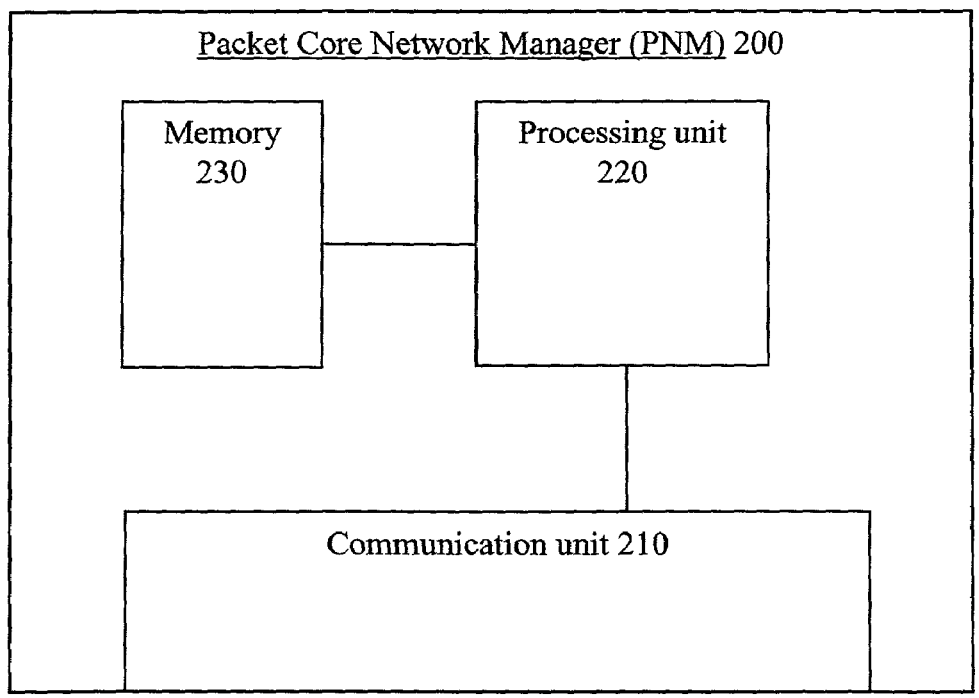
FIG. 2 is a block chart illustrating a Packet Core Network Manager according to a preferred embodiment of the invention.
Figure 3:
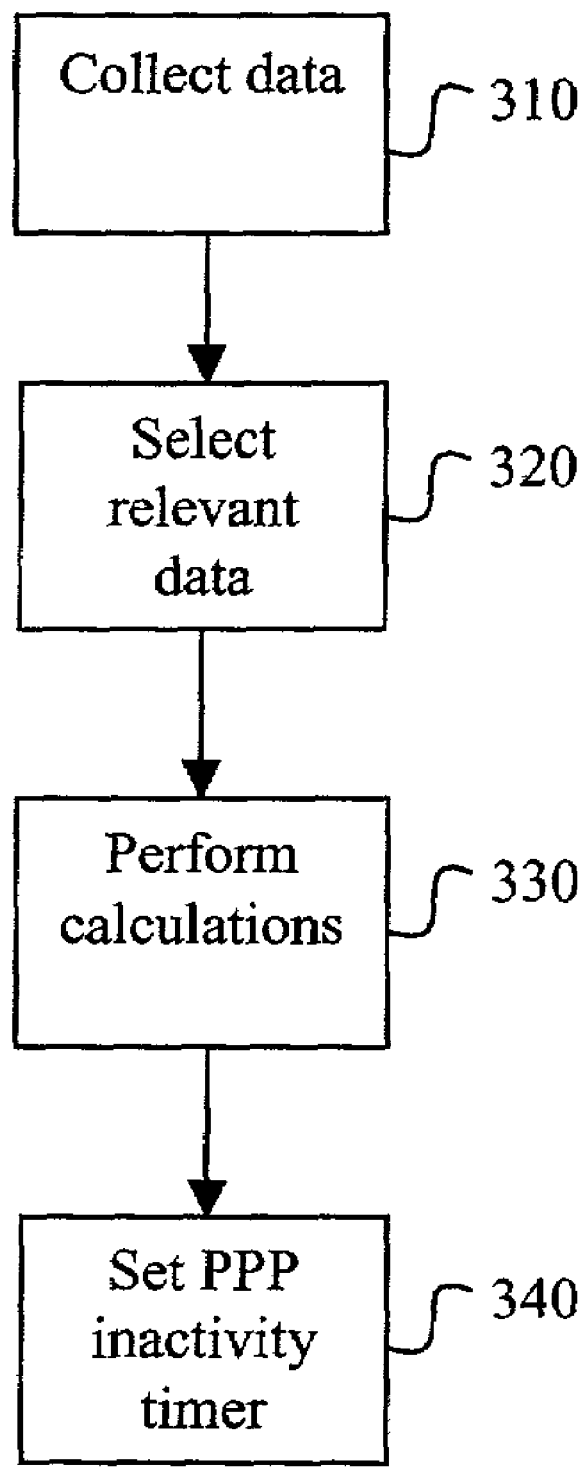
FIG. 3 is a flowchart illustrating the method of setting a PPP inactivity timer according to a preferred embodiment of the invention.

Referring now to FIGS. 2 and 3 that respectively depict a block chart that illustrates a Packet Core Network Manager (PNM) 200 according to a preferred embodiment of the invention, which replaces the prior art PNM 115 in FIG. 1, and a flowchart illustrating the method of setting a PPP inactivity timer according to a preferred embodiment of the invention.

The PNM 200 comprises a communication unit 210, a processing unit 220, and a memory 230.

The communication unit 210 sends and receives message and data to and from other packet core network nodes, such as for example the PDSN (112 in FIG. 1), a Home Agent (HA) (not shown) or an Authentication, Authorization, and Accounting (AAA) server (not shown), and the memory 230 stores data during a predefined interval of time. The processing unit 220 performs calculations, makes decisions, directs other units in the PDSN 200, and is responsible for establishing and terminating connections, such as for example PPP connections, which is why the processing unit 220 also sets the PPP inactivity timers.

As for the method, it starts with the step of collecting data 310, so-called performance indicators (PI). This can be performed in a number of ways, examples of which will be given below:

- The processing unit 220 stores in the memory 230 relevant data during normal activity.
- Other nodes (not shown) store data during normal activity and the processing unit 220 requests relevant data.
- Other nodes (not shown) store data during normal activity and automatically send relevant data with certain intervals.

The data that is collected can also be of different kinds, such as for example:

- The duration of subscriber PPP sessions, terminated or active or both, possibly during a pre-defined interval. The data could be for a certain subscriber, group of subscribers or all subscribers.
- The number of PPP sessions at a certain time.
- The arrival rate of subscribers.

Of the data collected in step 310, the processing unit 220 then selects the data that is deemed relevant, which can be decided based upon for example the PDSN load or subscriber data for a certain subscriber or a group of subscribers, such as for example requested Quality of Service parameters, step 320.

The processing unit then performs calculations using the selected data, step 330. In other words, the PIs are transformed into so-called Key Performance Indicators (KPIs). The calculations can be in one or more step. As an example, the processing unit 220 can calculate the arithmetic mean of the durations of subscriber PPP session, and the corresponding standard deviation. As a further example, the processing unit 220 can calculate a weighted mean of the durations of subscriber PPP session, for instance by discarding the highest and the lowest value or only using data for certain privileged subscribers, and the load on the PDSN 200 calculated as a percentage of the PPP connections it can support.

In a preferred embodiment, the processing unit 200 calculates the arithmetic mean of the durations of subscriber PPP session (KPI1), and the corresponding standard deviation (KPI2).

In step 340, the processing unit 220 sets the PPP inactivity timer, for a certain subscriber, group of subscribers or generally, for a pre-defined period of time after which a new calculation is done or until the next calculation is done, if the calculation is performed before the expiration of the pre-defined period. The PPP inactivity timer is set preferably according to the load. In a preferred embodiment, the PPP inactivity timer is set to:

| | |
|---|---|
| M * (KPI1 + KPI2) | during low load, |
| M * KPI1 | during normal load, and |
| M * (KIPI1 + KPI2) | during heavy load, | where M is a multiplicative factor equal or inferior to 1 and greater than zero, and preferably depending on the distribution of the subscriber inter-arrival time, although M could be greater than 1 in other embodiments. M is usually a constant, but its value can also be changed.

A person skilled in the art will appreciate that this is just one of many possibilities of the calculations, and that there may be more (or fewer) classes of load for which the definitions may vary. More complex prediction and optimisation algorithms can be used as for example neural network, genetic or any adaptive algorithms. However, if KPIs are not in themselves a measure of time, such as for example the load as a percentage of possible PPP connections, then a conversion has to be made to provide a time, since this time is automatically given if the KPIs are a measure of time.

It will also be appreciated that it is possible to have different PPP inactivity timers for different loads based upon a single KPI. For example, the PPP inactivity timer could be set to KPI1 during normal load, 1.2*KPI1 during low load, and to 0.8*KPI1 during heavy load.

As can be seen, the present invention provides load optimisation of the PDSN 200, by the setting of the PPP inactivity timers according to network statistics and the load on the PDSN 200. The load is balanced as the duration of the PPP sessions is set depending on the load of the PDSN 200.

Although the system and method of the present invention have been described in particular reference to certain radio telecommunications messaging standards, it should be realized upon reference hereto that the innovative teachings contained herein are not necessarily limited thereto and may be implemented advantageously with any applicable radio telecommunications standard. For example, in UMTS, after expiry of the mobile reachable timer the Serving GPRS Support Node (SGSN) may perform an implicit detach in order to return the Mobility Management (MM) contexts in the SGSN to IDLE state. The MM and Packet Data Protocol (PDP) contexts may then be deleted based on the behaviour of the subscribers as described in the present invention.

It is believed that the operation and construction of the present invention will be apparent from the foregoing description. The method and system shown and described are provided as exemplary embodiments of the invention, it will be readily apparent that various changes and modifications could be made therein without departing from the scope of the invention as defined by the claims set forth hereinafter.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for load optimization of a first node in a telecommunications network, the first node having a plurality of connections to a plurality of second nodes, an inactivity timer associated with each of the plurality of connections and a plurality of defined load levels, the method comprising the steps of:
   - collecting network data;
   - selecting the relevant collected network data for calculations;
   - calculating at least one value using the selected data; and
   - setting at least one inactivity timer based on the at least one value and on the load level of the first node.

2. The method of claim 1, wherein the collected data and the selected data comprise the duration of terminated connections.

3. The method of claim 2, wherein the at least one calculated value is the mean duration of the terminated connections.

4. The method of claim 3, wherein a second calculated value is the standard deviation of the duration of the terminated connections.

5. The method of claim 4, wherein the first node has defined low load, normal load and heavy load levels, and wherein the inactivity timer is set to a constant times:
   the mean duration of the terminated connections plus the standard deviation of the terminated connections when the first node is at the low load level;
   the mean duration of the terminated connections when the first node is at the normal load level;
   the mean duration of the terminated connections minus the standard deviation of the terminated connections when the first node is at the heavy load level.

6. The method according to claim 1, wherein the at least one inactivity timer is set for a certain subscriber.

7. The method according to claim 1, wherein the at least one inactivity timer is set for a group of subscribers.

8. The method according to claim 1, wherein the at least one value is calculated using an adaptive algorithm.

9. A management node in a telecommunications network for management of a managed node, the managed node having a plurality of connections to a plurality of second nodes, an inactivity timer is associated with each of the plurality of connections and a plurality of defined load levels, the management node comprising:
   a memory that stores network data; and
   a processing unit that;
      selects the relevant stored network data from the memory for calculations;
      calculates at least one value using the selected data; and
      sets at least one inactivity timer based on the at least one value and on the load level of the managed node.

10. The management node of claim 9, wherein the collected data and the selected data comprise the duration of terminated connections.

11. The management node of claim 10, wherein the at least one calculated value is the mean duration of the terminated connections.

12. The management node of claim 11, wherein a second calculated value is the standard deviation of the duration of the terminated connections.

13. The management node of claim 9, wherein the telecommunications network is a cdma2000 network, the first node is a Packet Data Serving Node (PDSN), the plurality of second nodes are Mobile Nodes (MNs), the connections are PPP connections, and the inactivity timer is a PPP inactivity timer.

14. The management node of claim 9, wherein the telecommunications network is an UMTS network, the managed node is a Serving GPRS Support Node (SGSN), the plurality of second nodes are Mobile Nodes (MNs) and the connections are PDP contexts.

* * * * *

UNITED STATES PATENT AND TRADEMARK OFFICE
CERTIFICATE OF CORRECTION

PATENT NO. : 7,187,682 B2  
APPLICATION NO. : 10/167956  
DATED : March 6, 2007  
INVENTOR(S) : Said Soulhi et al.

It is certified that error appears in the above-identified patent and that said Letters Patent is hereby corrected as shown below:

In Column 1, Line 19, delete "Invention" and insert -- Related Art --, therefor.

In Column 3, Line 63, delete "(KIPI1 + KPI2)" and insert -- (KPI1 - KPI2) --, therefor.

In Column 5, Line 27, in Claim 9, after "timer" delete "is".

In Column 6, Line 2, in Claim 9, after "that" delete ";" and insert -- : --, therefor.

Signed and Sealed this

First Day of April, 2008

JON W. DUDAS  
*Director of the United States Patent and Trademark Office*